United States Patent Office.

JOHN KAYE, JR., OF SETZLER'S STORE, PENNSYLVANIA.

Letters Patent No. 109,420, dated November 22, 1870.

IMPROVEMENT IN PRESERVING EGGS.

The Schedule referred to in these Letters Patent and making part of the same.

*To all whom it may concern:*

Be it known that I, JOHN KAYE, Jr., of Setzler's Store, in the county of Chester and State of Pennsylvania, have invented a new and useful Improvement in Preserving Eggs; and I do hereby declare that the following is a full, clear, and exact description thereof, which will enable others skilled in the art to make and use the same.

My discovery relates to the art of preserving eggs, and enables me to introduce to the public a new and improved process, by which their freshness may be continued for a long time and at a small cost; and It consists in the use of the preserving-liquid hereinafter named, in the manner described.

In carrying out my invention and discovery I pack the eggs in any convenient water-tight vessel, in contact with each other or without any intervening substance.

I then prepare a liquid by dissolving borax in boiling water in the proportion of one ounce of borax to one quart of water.

This liquid is poured onto the eggs until the eggs are covered to the depth of about two inches.

The vessel containing the eggs thus covered may or may not be excluded from the atmosphere, as may be found most convenient in keeping or transportation.

By this means eggs may be preserved perfectly fresh and suitable for any kind of use, for an indefinite length of time.

Having thus described my invention,

I claim as new and desire to secure by Letters Patent—

The process above described, of preserving the freshness of eggs by pouring thereon a solution of borax in boiling water in the proportion of about one ounce of borax to a quart of water.

JOHN KAYE, JR.

Witnesses:
MATTHIAS HUBER,
HARRISON BURNS.